(12) United States Patent
Heinemann et al.

(10) Patent No.: US 7,671,104 B2
(45) Date of Patent: Mar. 2, 2010

(54) FINE CELL, WATER-BLOWN RIGID POLYURETHANE FOAMS

(75) Inventors: Torsten Heinemann, Tarragona (ES); Walter Klän, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 159 days.

(21) Appl. No.: 10/852,867

(22) Filed: May 25, 2004

(65) Prior Publication Data
US 2005/0014857 A1 Jan. 20, 2005

Related U.S. Application Data

(63) Continuation of application No. 09/913,256, filed on Aug. 10, 2001, now abandoned.

(51) Int. Cl.
*C08G 18/28* (2006.01)
(52) U.S. Cl. ............... 521/130; 521/170; 521/172; 521/173; 521/174
(58) Field of Classification Search ............ 521/149, 521/170, 172, 173, 174, 130
See application file for complete search history.

(56) References Cited

U.S. PATENT DOCUMENTS

| 5,250,579 | A | 10/1993 | Smits et al. | 521/98 |
|---|---|---|---|---|
| 5,312,846 | A | 5/1994 | Smits et al. | 521/134 |
| 5,350,777 | A | 9/1994 | Yuge et al. | 521/117 |
| 5,614,566 | A | 3/1997 | Burkhart et al. | 521/132 |
| 5,916,480 | A | 6/1999 | Rotermund et al. | |
| 6,274,642 | B1 * | 8/2001 | Rotermund et al. | 521/174 |
| 6,322,743 | B1 * | 11/2001 | Stroobants | 264/321 |

FOREIGN PATENT DOCUMENTS

| EP | 0672697 | 9/1995 |
|---|---|---|
| EP | 0 498 628 | 7/1996 |
| EP | 0826706 | 3/1998 |
| GB | 2324798 | 11/1998 |
| WO | 9502620 | 1/1995 |

OTHER PUBLICATIONS

Ullmamms Encyclopedia of Industrial Chemistry, vol. A 21, (month unavailable) 1992, pp. 665-716, Polyurethanes, Dieter Dieterich, Konrad Uhlig.

\* cited by examiner

*Primary Examiner*—John Cooney
(74) *Attorney, Agent, or Firm*—Lyndanne M. Whalen

(57) ABSTRACT

The invention relates to a process for the production of water-blown, finely cellular rigid foams containing urethane groups and/or isocyanurate groups by the reaction of polyisocyanates with a polyol component in the form of an emulsion. The invention also relates to open-cell polyurethane foams which are foamable in the mould.

3 Claims, No Drawings

FINE CELL, WATER-BLOWN RIGID POLYURETHANE FOAMS

This application is a Continuation of U.S. Ser. No. 09/913,256, filed Aug. 10, 2001 which is now abandoned.

The invention relates to a process for the production of water-blown, fine cell rigid foams containing urethane groups and/or isocyanurate groups by the reaction of polyisocyanates with a polyol component in the form of an emulsion. The invention also relates to open-cell polyurethane foams which are foamable in the mould.

According to prior art, rigid polyurethane foams are produced from polyols having on average at least three hydroxyl groups per molecule, from isocyanates which are at least difunctional, catalysts, blowing agents and polysiloxane-polyoxyalkylene block mixed polymers and optionally the conventional additives.

A summary of the prior art, the raw materials used and the relevant processes may be found in G. Oertel (Ed.): "Kunststoffhandbuch", Volume VII, C. Hanser Verlag, Munich, 1983, in Houben-Weyl: "Methoden der organischen Chemie", Volume E20, Thieme Verlag, Stuttgart, 1987, pp. 1561 to 1757, and in "Ullmann's Encyclopedia of Industrial Chemistry", Vol. A21, VCH, Weinheim, 4th Edition, 1992, pp. 665 to 715.

In general, polyether polyols or polyester polyols or mixtures of these are used; there are on average at least three hydroxyl groups per molecule in the polyol mixture used and the hydroxyl value of the polyol mixture used is between 100 and 900.

The rigid polyurethane foams formed are for the most part predominantly closed-cell. Their bulk densities are between 5 and 950 $kg \cdot m^{-3}$, mostly between 10 and 350 $kg \cdot m^{-3}$, with bulk densities of between 20 and 70 $kg \cdot m^{-3}$ being used particularly frequently.

Recent developments in the field of rigid polyurethane foams are related to the specifically controlled production of predominantly open-cell polyurethane- or polyisocyanurate-modified rigid polyurethane foams which are used as insulating materials for example in vacuum panels. When the above-mentioned open-cell rigid foams are to be used in vacuum panels, a cell diameter as small as possible is particularly important, as it determines the efficiency of the insulation. The smaller the cell diameter, the less evacuation is necessary in order to achieve a specific insulating effect. The average cell diameter of the water-blown rigid polyurethane foams obtained by prior art is generally greater than 150 μm; foams having such a cell diameter are generally unsuitable for vacuum applications.

The production of open-cell rigid polyurethane foams is in principle known. Thus U.S. Pat. No. 5,350,777 describes the use of alkaline-earth salts of long-chain fatty acids as cell openers.

EP-A 498 628 describes the production of open-cell rigid foams by the usage of a thermally activated blowing agent. The disadvantage of this process is that the cells of the foam can be opened only when a minimum temperature is exceeded in the course of the foaming process, so that the resulting foams do not have a uniform proportion of open cells throughout the volume filled with the foam.

DE-A 43 03 809 discloses a process for the production of rigid foams having an increased proportion of open cells which utilises the cell-opening properties of a liquid polyolefin additive. This process has the disadvantage of a narrow field of application and the further disadvantage that the cells coarsen rapidly as the amount of polyolefin additive is increased.

In U.S. Pat. No. 5,250,579 and U.S. Pat. No. 5,312,846, cell-opening substances having a surface tension of less than 23 $mJ \cdot m^{-2}$ are disclosed. These have the disadvantage that they contain organically bound halogen.

The objective of the present invention was to find a process for the production of water-blown, fine cell and optionally open-cell rigid polyurethane foams, wherein the rigid polyurethane foams according to the invention retain the required final properties—open cell and fine cells content—even during a foaming in the mould.

It has been found that fine cell and optionally open-cell rigid polyurethane foams are obtained when a polyisocyanate is foamed with a water-containing polyol formulation in the form of an emulsion.

The invention accordingly provides a process for the production of fine cell rigid polyurethane and/or polyisocyanurate foams by the reaction of A) a polyisocyanate having an NCO content of 20 to 48 wt. % with
B) a polyol component in the form of an emulsion, having on average at least two groups which are reactive with isocyanate and containing
　1) at least one at least difunctional polyol,
　2) water,
　3) catalyst,
　4) optionally auxiliary substances and additives.

The invention also provides a polyurethane or polyisocyanurate foam produced in the mould having an open cells content, measured in accordance with DIN ISO 4590-92, of >85%, preferably >90%, with an overpacking of >3%, based on the minimum amount of filling. This foam can be produced by the process according to the invention.

Polyol formulations according to the invention contain at least one polymer which is immiscible with water, possesses at least one functional group which is reactive with isocyanate and contains hydrogen atoms, and has a number average molecular weight of 150 to 12,500 g/mol, preferably 200 to 1500 g/mol. Examples of this are: triglycerides, for example, castor oil, or castor oil modified by transesterification/amidation reactions with monohydric or polyhydric alcohols or amines, or fatty acids such as stearic acid, oleic acid, linoleic acid or ricinoleic acid. The polyol formulation contains 5 to 99 parts by weight, preferably 20 to 80 parts by weight, of this component. The polymer which is immiscible with water is preferably an at least difunctional polyol.

In order to have the functionality necessary for the foaming, the polyol formulations according to the invention contain at least one polyol which has at least two hydrogen atoms which are reactive with isocyanates and a number average molecular weight of 150 to 12,500 g/mol, preferably 200 to 1500 g/mol. Such polyols can be obtained by polyaddition of alkylene oxides such as, for example, ethylene oxide, propylene oxide, butylene oxide, dodecyl oxide or styrene oxide, preferably propylene oxide or ethylene oxide, to starter compounds such as water or polyhydric alcohols such as sucrose, sorbitol, pentaerythritol, trimethylolpropane, glycerol, propylene glycol, ethylene glycol, diethylene glycol as well as mixtures of the above-mentioned starter compounds. The starter compound used may also be ammonia, or compounds having at least one primary, secondary or tertiary amino group, for example, aliphatic amines such as ethylenediamine, oligomers of ethylenediamine (for example, diethylenetriamine, triethylenetetramine or pentaethylenehexamine), ethanolamine, diethanolamine, triethanolamine, N-methyl- or N-ethyldiethanolamine, 1,3-propylenediamine, 1,3- or 1,4-butylenediamine, 1,2-hexamethylenediamine, 1,3-hexamethylenediamine, 1,4-hexamethylenediamine, 1,5-hexamethylenediamine or 1,6-hexamethylenediamine, aromatic amines such as phenylenediamines, tolylenediamines (2,3-tolylenediamine, 3,4-tolylenediamine, 2,4-tolylenediamine, 2,5-tolylenediamine, 2,6-tolylenediamine or mixtures of the above-mentioned isomers), 2,2'-diaminodiphenylmethane, 2,4'-diaminodiphenylmethane, 4,4'-diaminodiphenylmethane or mixtures of these isomers. The polyol formulation contains 0 to 95 parts by weight, preferably 10 to 40 parts by weight, of this component.

Polyol formulations according to the invention can also contain polyester polyols having a number average molecular weight of 100 to 30,000 g/mol, preferably 150 to 10,000 g/mol, particularly preferably 200 to 600 g/mol, which can be prepared from aromatic and/or aliphatic dicarboxylic acids and polyols having at least two hydroxyl groups. Examples of dicarboxylic acids are phthalic acid, fumaric acid, maleic acid, azelaic acid, glutaric acid, adipic acid, suberic acid, terephthalic acid, isophthalic acid, decanedicarboxylic acid, malonic acid, glutaric acid and succinic acid. Individual dicarboxylic acids or any mixtures of different dicarboxylic acids can be used. Instead of the free dicarboxylic acids, the corresponding dicarboxylic acid derivatives such as, for example, dicarboxylic mono- or diesters of alcohols having one to four carbon atoms, or dicarboxylic anhydrides, can also be used. The following are preferably used as alcohol component for the esterification: ethylene glycol, diethylene glycol, triethylene glycol, tetraethylene glycol, 1,2-propanediol, 1,3-propanediol, 1,4-butanediol, 1,5-pentanediol, 1,6-hexanediol, 1,10-decanediol, glycerol, trimethylolpropane, or mixtures of these. The polyol formulations according to the invention can also contain polyether esters, which are obtained, for example, as described in EP-A 250 967, by reaction of phthalic anhydride with diethylene glycol and subsequently with ethylene oxide. The polyol formulation can contain 0 to 90 parts by weight, preferably 5 to 30 parts by weight, of polyester polyol.

The polyol formulations according to the invention also contain at least one catalyst in quantities of 0 to 10 parts by weight, preferably 0.5 to 5 parts by weight. The conventional catalysts of polyurethane chemistry can be used according to the invention. Examples of such catalysts are: triethylenediamine, N,N-dimethylcyclohexylamine, tetramethylenediamine, 1-methyl-4-dimethylaminoethylpiperazine, triethylamine, tributylamine, dimethylbenzylamine, N,N',N"-tris(dimethylaminopropyl)-hexahydrotriazine, dimethylaminopropylformamide, N,N,N',N'-tetramethylethylenediamine, N,N,N',N'-tetramethylbutanediamine, tetramethylhexanediamine, pentamethyldiethylenetriamine, tetramethyl diaminoethyl ether, dimethylpiperazine, 1,2-dimethylimidazole, 1-azabicyclo[3.3.0]octane, bis(dimethylaminopropyl)urea, N-methylmorpholine, N-ethylmorpholine, N-cyclohexylmorpholine, 2,3-dimethyl-3,4,5,6-tetrahydropyrimidine, triethanolamine, diethanolamine, triisopropanolamine, N-methyldiethanolamine, N-ethyldiethanolamine, dimethylethanolamine, tin(II) acetate, tin (II) octanoate, tin(II) ethylhexanoate, tin(II) laurate, dibutyltin diacetate, dibutyltin dilaurate, dibutyltin maleate, dioctyltin diacetate, tris(N,N-dimethylaminopropyl)-s-hexahydrotriazine, tetramethylammonium hydroxide, potassium acetate, sodium acetate, sodium hydroxide or mixtures of these or similar catalysts.

According to the invention, ionic and non-ionic emulsifiers can also be used in quantities of 0 to 10 parts by weight, preferably 0.5 to 2 parts by weight. Such emulsifiers are described, for example, in "Römpp Chemie Lexikon", Volume 2, Thieme Verlag, Stuttgart, 9th Edition, 1991, p. 1156 ff.

The polyol component according to the invention contains 0.1 to 10 parts by weight, preferably 0.5 to 5 parts by weight, of water.

It is essential for the process according to the invention that the polyol component be used in the form of an emulsion. This means that at least one of the components of the polyol component must not be miscible with the rest of the formulation; i.e. as a rule, that at least one compound is included which is neither water-soluble nor miscible with water and which optionally has hydrogen atoms which are reactive with isocyanate. It has been found that the use of a polyol component in the form of an emulsion results in foams having a considerably greater cell fineness.

Aromatic polyisocyanates of the type described in Justus Liebigs Annalen der Chemie, 562 (1949) 75 can be used as the isocyanate component, for example those corresponding to the formula

Q(NCO)n, wherein n can have values of 2 to 4, preferably 2, and

Q denotes an aliphatic hydrocarbon group having 2 to 18, preferably 6 to 10 carbon atoms, a cycloaliphatic hydrocarbon group having 4 to 15, preferably 5 to 10 carbon atoms, an aromatic hydrocarbon group having 8 to 15, preferably 8 to 13 carbon atoms.

Polyisocyanates of the type described in DE-OS 28 32 253 are particularly preferred. As a rule the technically readily accessible polyisocyanates are particularly preferred, for example, tolylene 2,4- and 2,6-diisocyanate and any mixtures of these isomers ("TDI"), polyphenyl polymethylene polyisocyanates, which are prepared by aniline-formaldehyde condensation and subsequent phosgenation ("crude MDI") and polyisocyanates containing carbodiimide groups, urethane groups, allophanate groups, isocyanurate groups, urea groups or biuret groups ("modified polyisocyanates"), in particular modified polyisocyanates which are derived from tolylene 2,4- and 2,6-diisocyanate or from diphenylmethane 4,4'- and/or 2,4'-diisocyanate.

Prepolymers of the above-mentioned isocyanates and of organic compounds having at least one hydroxyl group can also be used. By way of example, one may mention polyols or polyesters having one to four hydroxyl groups and (number average) molecular weights of 60 to 1,400.

Other substances which may be used concomitantly are paraffins or fatty alcohols or dimethylpolysiloxanes and pigments or dyes, also stabilisers against ageing and weathering influences, plasticisers and fungistatic and bacteriostatic substances as well as fillers such as barium sulphate, kieselguhr, carbon black or prepared chalk. These are mostly added to the polyol component in quantities of 0 to 10 parts by weight, preferably 0 to 5 parts by weight.

Further examples of optionally used surface-active additives and foam stabilisers as well as cell regulators, reaction inhibitors, stabilisers, flame retardants, dyes and fillers, as well as fungistatic and bacteriostatic substances, together with details of the method of use and mode of action of these additives are given in Vieweg/Höchtlen (Eds.): "Kunststoff-Handbuch", Volume VII, Carl Hanser Verlag, Munich 1966, pages 121 to 205, and G. Oertel (Ed.): "Kunststoffhandbuch", Volume VII, Carl Hanser Verlag, 2nd Edition, Munich, 1983.

The polyurethane or polyisocyanurate foams produced in the mould according to the invention have a proportion of open cells, measured in accordance with DIN ISO 4590-92, of >85%, preferably >90%, and a degree of compression of >3%, based on the minimum amount of filling. The minimum amount of filling of a moulding is the amount of finally reacted rigid polyurethane foam necessary to just fill the mould.

The invention also provides the use of the rigid foams according to the invention as an intermediate layer for composite elements, as filling substrates for vacuum insulating panels and for the foaming of cavities of cold stores as well as in the construction of containers.

The process according to the invention is preferably used for the foaming of cavities of refrigeration and freezing equipment. It can also be used in the heat insulation, for example, of hot-water tanks or long-distance heating pipes. Foams can, of course, also be produced by block foaming or by the known per se double transport process (see "Kunststoffhandbuch", Volume 7: Polyurethane, Carl Hanser Verlag, Munich, Vienna, 3rd Edition, 1993, p. 148).

EXAMPLES

| | |
|---|---|
| Polyol A: | polyethylene oxide polyether ($M_n$ = 300) based on trimethylolpropane |
| Polyol B: | polyether ester ($M_n$ = 375) based on phthalic anhydride, diethylene glycol and ethylene oxide |
| Polyol C: | Castor oil [from the firm Alberding + Boley, Krefeld] |
| Isocyanate: | polyphenyl polymethylene polyisocyanate, NCO content 31.5 wt. % (Desmodur ® 44V20, Bayer AG) |
| Stabiliser: | silicone stabiliser (Tegostab B 8404, Th. Goldschmidt AG, Essen) |
| Emulsifier: | sodium sulfate salt of an ethoxylated fatty acid alcohol, 30 wt. % in water (from the firm Servo, NL-Delden) |
| Catalyst 1: | dimethylcyclohexylamine |
| Catalyst 2: | potassium acetate (25 wt. % in diethylene glycol) |

The foaming was carried out in high-pressure machine HK 165 from the firm Hennecke. In each case two test pieces were produced:

| | |
|---|---|
| Test piece 1: | freely foamed block having the dimensions 50 × 50 × 40 cm³ |
| Test piece 2: | foamed in a mould; dimensions of test piece 9 × 40 × 70 cm³; degree of compression 8% |

Example 1 (According to the Invention)

100 parts by weight of a mixture of 92 parts by weight polyol C, 2.5 parts by weight catalyst 1, 1 part by weight catalyst 2, 2.5 parts by weight water and 2 parts by weight stabiliser was reacted with 145 parts by weight of isocyanate. The polyol mixture was a white emulsion.

| | |
|---|---|
| Test piece 1: | bulk density 52 kg/m³; proportion of open cells (DIN ISO 4590-92): 95% cell size from micrograph (using light microscopy): 100 µm |
| Test piece 2: | bulk density 75 kg/m³; proportion of open cells (DIN ISO 4590-92): 93% cell size from micrograph (using light microscopy): 90 µm |

Example 2 (According to the Invention)

100 parts by weight of a mixture of 19.2 parts by weight polyol A, 19.7 parts by weight polyol B, 57.7 parts by weight polyol C, 0.8 parts by weight catalyst 1, 0.9 parts by weight catalyst 2, 3.6 parts by weight emulsifier, 0.9 parts by weight water and 1.4 parts by weight stabiliser was reacted with 127 parts by weight of isocyanate. The polyol mixture was a white emulsion.

| | |
|---|---|
| Test piece 1: | bulk density 46 kg/m³; proportion of open cells (DIN ISO 4590-92): 98% cell size from micrograph (using light microscopy): 90 µm |
| Test piece 2: | bulk density 69 kg/m³; proportion of open cells (DIN ISO 4590-92): 96% cell size from micrograph (using light microscopy): 80 µm |

Example 3 (Comparison Example)

100 parts by weight of a mixture of 46.3 parts by weight polyol A, 46.3 parts by weight polyol B, 2.5 parts by weight catalyst 1, 1 part by weight catalyst 2, 2 parts by weight water and 2 parts by weight stabiliser was reacted with 127 parts by weight of isocyanate. The polyol mixture was a clear solution.

| | |
|---|---|
| Test piece 1: | bulk density 46 kg/m³; proportion of open cells (DIN ISO 4590-92): 9% cell size from micrograph (using light microscopy): 160 µm |
| Test piece 2: | bulk density 69 kg/m³; proportion of open cells (DIN ISO 4590-92): 9% cell size from micrograph (using light microscopy): 150 µm |

The Examples show that rigid foams of a particular cell fineness are obtained by using polyol emulsions.

The invention claimed is:

1. A process for the production of a fine celled rigid polyurethane and/or polyisocyanurate foam comprising reacting a mixture consisting of:
    a) a polyisocyanate having an NCO content of from 20 to 48% by weight
    with
    b) a polyol component which is in the form of an emulsion having an average of at least two isocyanate-reactive groups consisting of
        (1) a polyol having a functionality of 2,
        (2) at least one polyol obtained by
            (i) polyaddition of at least one alkylene oxide selected from the group consisting of ethylene oxide, propylene oxide, butylene oxide, dodecyl oxide and styrene oxide to a starter compound selected from the group consisting of
                (A) water, sucrose, sorbitol, pentaerythritol, trimethylolpropane, glycerol, propylene glycol, ethylene glycol, diethylene glycol, and mixtures thereof,
                (B) aliphatic amines selected from the group consisting of ethylene diamine, oligomers of ethylene diamine, ethanolamine, diethanolamine, triethanolamine, N-methyl-diethanolamine, N-ethyl-diethanolamine, 1,3-propylene diamine, 1,3-butylene diamine, 1,4-butylene diamine, 1,2-hexamethylene diamine, 1,3-hexamethylene diamine, 1,4-hexamethylene diamine, 1,5-hexamethylene diamine, and 1,6-hexamethylene diamine,
(C) aromatic amines selected from the group consisting of phenylenediamines, 2,3-toluene diamine, 3,4-toluene diamine, 2,4-toluene diamine, 2,5-toluene diamine, 2,6-toluene diamine, and isomer mixtures of toluene diamine, 2,2'-diaminodiphenylmethane, 2,4-diaminodiphenylmethane, 4,4'-diaminodiphenylmethane and isomer mixtures of diaminodiphenylmethane, and/or (ii) esterification of
(A) an acid selected from the group consisting of phthalic acid, fumaric acid, maleic acid, azelaic acid, glutaric acid, adipic acid, suberic acid, terephthalic acid, isophthalic acid, decanecarboxylic acid, malonic acid, glutaric acid, succinic acid and mixtures thereof, or (B) a dicarboxylic acid anhydride, or (C) a dicarboxylic acid mono-ester of an alcohol having from 1 to 4 carbon atoms, or (D) a dicarboxylic acid di-ester of an alcohol having from 1 to 4 carbon atoms, with (E) an alcohol selected from the group consisting of ethylene glycol, diethylene glycol, triethylene glycol, tetraethylene glycol, 1,2-propanediol, 1,3-propanediol, 1,4-butanediol, 1,5-pentanediol, 1,6-hexanediol, 1,10-decanediol, glycerol, trimethylolpropane and mixtures of these alcohols, (3) water,
(4) a catalyst, and
(5) at least one material selected from the group consisting of surface active additives, foam stabilizers, cell regulators, reaction inhibitors, flame retardants, dyes, fillers, fungistatic agents, bacteriostatic agents, and combinations thereof.

2. The process of claim 1 in which the polyol (2) has a number average molecular weight of from 150 to 12,500 g/mol.

3. The process of claim 1 in which the polyol (1) is castor oil.

* * * * *